(12) United States Patent
Lee

(10) Patent No.: US 8,665,094 B2
(45) Date of Patent: Mar. 4, 2014

(54) RFID TAG-EMBEDDED CASINO CHIP

(75) Inventor: Sung Won Lee, Incheon (KR)

(73) Assignee: System Integration Technology Korea Co., Ltd., Incheon (KR)

( * ) Notice: Subject to any disclaimer, the term of this patent is extended or adjusted under 35 U.S.C. 154(b) by 766 days.

(21) Appl. No.: 12/841,765

(22) Filed: Jul. 22, 2010

(65) Prior Publication Data

US 2011/0018715 A1    Jan. 27, 2011

Related U.S. Application Data

(63) Continuation of application No. PCT/KR2010/003792, filed on Jun. 11, 2010.

(30) Foreign Application Priority Data

Jul. 23, 2009 (KR) .................. 10-2009-0067497

(51) Int. Cl.
*B60R 25/00* (2013.01)

(52) U.S. Cl.
USPC .............. 340/572.7; 340/13.26; 340/572.8; 463/25; 343/741

(58) Field of Classification Search
USPC .............. 343/866, 803, 788, 741; 463/47
See application file for complete search history.

(56) References Cited

U.S. PATENT DOCUMENTS

| 6,021,949 | A | * | 2/2000 | Boiron ...................... 235/492 |
| 2007/0026949 | A1 | * | 2/2007 | Charlier et al. ............. 463/47 |
| 2007/0105616 | A1 | | 5/2007 | Chapet et al. |
| 2007/0139285 | A1 | * | 6/2007 | Maruyama et al. ........ 343/741 |
| 2008/0252423 | A1 | * | 10/2008 | Murdoch et al. .......... 340/10.1 |

FOREIGN PATENT DOCUMENTS

| JP | 2000-243768 A | 9/2000 |
| JP | 2003-117066 A | 4/2003 |
| JP | 2006-185397 A | 7/2006 |
| KR | 10-2003-0025954 A | 3/2003 |
| KR | 10-2007-0012462 A | 1/2007 |

OTHER PUBLICATIONS

International Search Report dated Jan. 27, 2011 of PCT/KR2010/003792 which is the parent application—4 pages.
Notice of Allowance dated May 10, 2010 of corresponding Korean Patent Application No. 10-2009-0067497—2 pages.

* cited by examiner

*Primary Examiner* — Daniel Wu
*Assistant Examiner* — Frederick Ott
(74) *Attorney, Agent, or Firm* — Knobbe, Martens, Olson & Bear, LLP

(57) ABSTRACT

Disclosed is a Radio Frequency Identification (RFID) tag-embedded casino chip. The RFID tag-embedded casino chip includes an Integrated Circuit (IC) and an antennae connected to the IC. The RFID tag has a frequency which is equal to or greater than 20 MHz and is equal to or less than 25 MHz.

8 Claims, 3 Drawing Sheets ained in the groove; forming the protective material over the RFID tag and the antennae; and forming the injection-molded layer over the rim portion of the plate.

RFID TAG-EMBEDDED CASINO CHIP

CROSS-REFERENCE TO RELATED PATENT APPLICATIONS

This application is a continuation application under 35 U.S.C. §365(c) of International Application No. PCT/KR2010/003792, filed Jun. 11, 2010 designating the United States. This application further claims the benefit of the earlier filing date under 35 U.S.C. §365(b) of Korean Patent Application No. 10-2009-0067497 filed Jul. 23, 2009. This application incorporates herein by reference the International Application No. PCT/KR2010/003792 and the Korean Patent Application No. 10-2009-0067497 in their entirety.

FIELD

The present disclosure relates, in general, to a Radio Frequency Identification (RFID) tag-embedded casino chip.

BACKGROUND

Casino chips are used to identify amounts of money or players in casinos and are mainly divided into value chips with a nominal value and non-value chips without a nominal value.

Value chips are chips which can be cashed in, which have surfaces on which the nominal value and the casino logo are printed, and can always be cashed in at casinos. Although there are differences between them, the casino chips used by most casinos correspond to one thousand Won, five thousand Won, ten thousand Won, one hundred thousand Won, one million Won, five million Won, and ten million Won in terms of the monetary value.

Non value chips are chips which cannot be cashed in, and are generally distinguishable by several colors, for example, seven colors, to identify players in games such as Roulette or Tai-Sai.

Since casino chips are articles which substitute for a considerable sum of money, efforts are required to be made to prevent the casino chips from being transferred to the outside and their forgery, falsification, etc. from occurring. As methods for preventing these, there are methods using a hologram, UV ink, watermarks, magnetic strips, barcodes, Radio Frequency Identification (RFID), etc., and among these methods, a method using RFID is advantageous in that the lifespan is semipermanent, forgery and falsification are impossible, and efficient management is performed, compared to methods using magnetic strips or barcodes.

Therefore, methods using RFID have recently started to be frequently used. RFID technology is a technology that identifies information from a long distance away using radio waves. For this, RFID tags and an RFID reader are required. Each tag is composed of an antennae and an IC, wherein information is recorded in the IC and is transmitted to the reader through the antennae. This information is used to identify the object to which the tag is attached.

When RFID technology is applied to casino chips using a frequency of 13.56 MHz which is the most generally used frequency when RFID technology is utilized, transmittance is low. The number of casino chips which a human being can hold in one hand is about 20, but there is a problem because when 20 chips are stacked in a pile, it is difficult for a reader located below a table to identify all 20 casino chips.

Further, when RFID technology using a frequency of 13.56 MHz is applied to casino chips, the range of identification is typically 10 cm or less. When power is increased to further increase the range of identification, there is a problem in that interference with other RFID tags located within a distance of 40 cm occurs, thus making it difficult to accurately identify information stored in the casino chips.

Furthermore, there is a problem in that the ICs or antennae of RFID tags are damaged by high temperature and pressure during the process of manufacturing casino chips.

SUMMARY

One aspect of the invention provides a casino chip. The casino chip comprises: a Radio Frequency Identification (RFID) tag configured to generate a radio frequency signal; an antennae connected to the tag and comprising a coil wound in a diameter from 22 mm to 27 mm; and wherein the radio frequency signal generated by the RFID tag is in a frequency range from 20 MHz to 25 MHz such that one RFID reader can identify each chip even if about 20 of the casino chip are stacked together in a pile and individually generate such signals.

In the foregoing casino chip, the casino chip may further comprise: a plate comprising a cavity and a groove, wherein the RFID tag is positioned in the cavity, the antennae is positioned in the groove; a protective material formed over the RFID tag and the antennae; and a injection-molded layer covering a rim portion of the plate. The plate may include one or more holes formed therein. The plate may be made of a mixture of nylon and copper. The protective material may be formed using an epoxy-based molding solution. The frequency range may be from 21 MHz to 24 MHz. The casino chip may further comprise: a decal covering a center portion of the plate, wherein the decal comprises a magnetic sheet.

Another aspect of the invention provides a method of identifying casino chips. The method of identifying casino chips comprises: providing a first pile of casino chips, wherein the first pile comprises 10-20 of the foregoing casino chip stacked together; providing a second pile of casino chips next to the first pile, wherein the second pile comprises 10-20 of the foregoing casino chip stacked together; and identifying each casino chip in the first pile and further identifying each casino chip in the second pile using one reader when the first and second piles are apart from each other by about 3 cm or more.

Another aspect of the invention provides a casino chip. The casino chip comprises: a plate comprising a core portion and a rim portion surrounding the core portion, wherein the plate comprises a cavity and a groove in the core portion; a radio frequency identification (RFID) tag positioned in the cavity; an antennae positioned in the groove and connected to the RFID tag; a protective material formed over at least one of the cavity and the groove to cover at least one of the RFID tag and the antennae; and an injection-molded layer covering the rim portion of the plate, wherein the plastic material does not contact the RFID tag. The injection molded layer may not cover the core portion. The protective material may be formed over both the cavity and the groove to cover the RFID tag and the antennae. The protective material may comprise an epoxy-based compound. The RFID tag may be configured to generate radio frequency signals in a frequency range from 20 MHz to 25 MHz. The groove may be in the form of a circle having a diameter from 22 mm to 27 mm, and the antennae comprises a coil wound in the circular groove. The casino chip may further comprise a decal covering the protective material formed over at least one of the cavity and the groove.

Another aspect of the invention provides a method of making the chip. The method of making the chip comprises: providing an unfinished casino chip comprising the plate, the RFID tag positioned in the cavity, and the antennae positioned in the groove; applying the protective material over at least one of the cavity and groove to cover at least one of the RFID tag and the antennae; and applying an injection-molding material over the rim portion of the late to cover the rim portion and not to contact the RFID tag.

One aspect of the present invention provides an RFID tag-embedded casino chip, in which a frequency falling within a specific range is selected and used, thus enabling about 20 casino chips, which correspond to the maximum number of chips that can be stacked and held in one hand, to be simultaneously and accurately identified.

Another aspect of the present invention provides an RFID tag-embedded casino chip, which can reduce the distance of interference with surrounding reading areas.

A further aspect of the present invention provides an RFID tag-embedded casino chip, which includes an antennae capable of improving communication performance.

Yet another aspect of the present invention provides an RFID tag-embedded casino chip, which can prevent the IC or antennae of an RFID tag from being damaged by high temperature and pressure during the process for manufacturing the casino chip.

The present invention provides, in various embodiments, a Radio Frequency Identification (RFID) tag-embedded casino chip, wherein the RFID tag comprises an Integrated Circuit (IC); an antennae is connected to the IC of the RFID tag. The RFID tag has a frequency which is equal to or greater than 20 MHz and is equal to or less than 25 MHz.

The antennae is implemented as a coil wound around an outside of the IC multiple times.

The casino chip further comprises a plate in which a groove (recess or cavity) for receiving the RFID tag therein is formed; a protective material formed on top of the IC and on top of the antennae; and a case formed to enclose an outer surface of the plate. The plate includes one or more holes formed therein.

The plate is made of a mixture of nylon and copper.

The protective film is formed using an epoxy-based molding solution.

The antennae is implemented as a coil wound five or more times when the coil has a diameter which is equal to or greater than 22 mm and is equal to or less than 27 mm.

The RFID tag has a frequency which is equal to or greater than 21 MHz and is equal to or less than 24 MHz.

The casino chip further comprises a decal attached to a center portion of a top surface of the plate, the decal being a magnetic sheet.

The above-described RFID tag-embedded casino chip according to the present invention has the following advantages.

The RFID tag-embedded casino chip has a unique tag frequency which is equal to or greater than 20 MHz and is equal to or less than 25 MHz, thus enabling about 20 casino chips, which correspond to the maximum number of chips that can be stacked and held in one hand, to be simultaneously and accurately identified.

Further, the RFID tag-embedded casino chip can reduce the distance of interference with surrounding reading areas to 3 cm or less from 40 cm as in the conventional technology.

Furthermore, the RFID tag-embedded casino chip can improve communication performance by using an antennae implemented as a coil.

Furthermore, the RFID tag-embedded casino chip can prevent the IC or antennae of an RFID tag from being damaged by high temperature and pressure during the process for manufacturing the casino chip.

DETAILED DESCRIPTION OF EMBODIMENTS

Hereinafter, an RFID tag-embedded casino chip according to various embodiments of the present invention will be described in detail with reference to the attached drawings.

Figure 1:
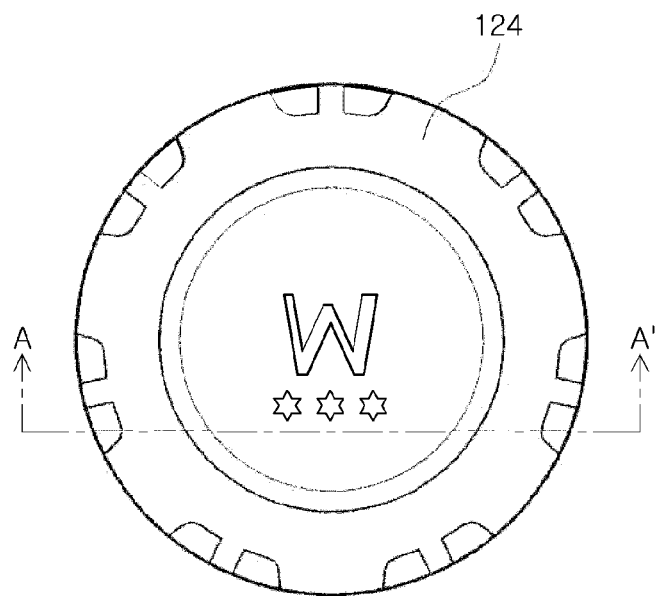
FIG. 1 is a plan view showing an RFID tag-embedded casino chip according to one embodiment of the present invention.
Figure 2:
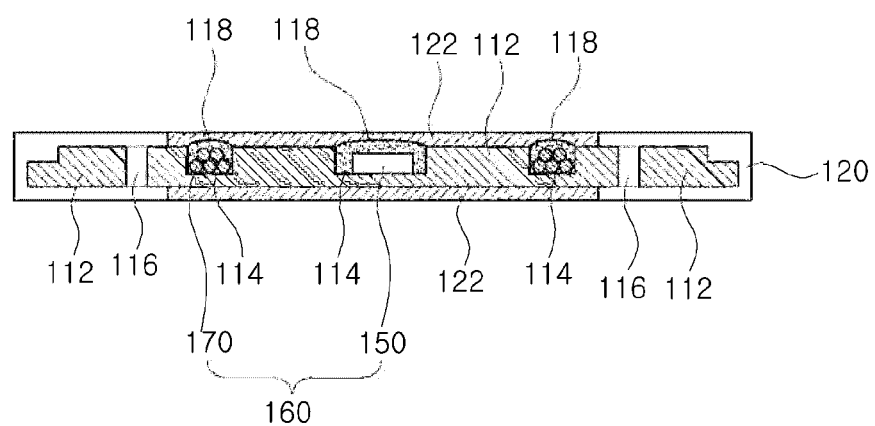
FIG. 2 is a sectional view taken along line A-A' of FIG. 1.

FIG. 1 is a plan view showing an embodiment of an RFID tag-embedded casino chip according to the present invention, and FIG. 2 is a sectional view showing an embodiment of the RFID tag-embedded casino chip according to the present invention taken along line A-A' of FIG. 1.

As shown in FIGS. 1 and 2, an embodiment of the RFID tag-embedded casino chip according to the present invention includes a plate 112, an RFID tag 160 mounted in the plate 112, a protective film 118 formed on the top of the RFID tag 160, and a case 120 formed to enclose the outer surface of the plate 112.

The plate 112 and the protective film 118 will be described later with reference to FIGS. 4 and 5.

The RFID tag 160 including an Integrated Circuit (IC) 150 is connected to an antennae 170.

The IC 150 is a composite electronic device or system in which a large number of electronic circuit elements are combined with one another, on a substrate or to be inseparably integrated with the substrate, and in which pieces of information about casino chips are stored. That is, information about the unique ID of each casino chip, the monetary value assigned to the casino chip, etc. is stored in the IC 150.

The antennae 170 is connected to the IC 150, and is preferably implemented as a coil wound around the outside of the IC 150 multiple times. The antennae 170 performs communication using the RFID tag 160 having a frequency which is equal to or greater than 20 MHz and is equal to or less than 25 MHz, thus transmitting the information stored in the IC 150 and receiving updated information from the outside. That is, when a player lays a bet on the table using casino chips, information about the number of casino chips and the monetary value corresponding thereto within a predetermined bet area is transmitted, and the casino chips can be converted into money based on the transmitted information, the money being displayed on a separate display device (not shown).

In this case, the antennae 170 can be implemented as a coil wound around the circumference of a circle having a predetermined radius from the center of the plate 112, and preferably has an RFID frequency which is equal to or greater than 21 MHz and is equal to or less than 24 MHz when the coil is wound around five or more times in the case where the diameter of the coil is equal to or greater than 22 mm and is equal to or less than 27 mm.

In the embodiment of the present invention, although the antennae 170 is implemented as the coil wound around the outside of the IC 150 multiple times to cause the RFID tag 160 to have a frequency which is equal to or greater than 20 MHz and is equal to or less than 25 MHz, the present invention is not limited to this embodiment, and various methods such as forming the antennae on a Printed Circuit Board (PCB) through etching or forming the antennae using conductive ink can be used.

However, the case where the coil is used is preferred from the standpoints of frequency stability, durability based on the property of being resistant to injection pressure, and the desired weight of a casino chip realized in such a way that space on the PCB is saved and the saved space is filled with a material having a high specific gravity.

The case 120 may be formed via injection molding using a material such as plastic or ceramic, but it is apparent that any material having both predetermined solidity and protective function or any molding method can be used. The case 120 may represent the external pattern, monetary value, etc. of the casino chip via two or more injection molding processes.

In the embodiment of the present invention, the external pattern, monetary value, etc. of each casino chip are presented by forming the case 120 via two or more injection molding processes, and the case 120 is shown to be formed even on the bottom surface of the plate 112. However, the present invention is not limited to the embodiment and can be configured such that, after the case 120 is formed, a separate printing paper (not shown) can be attached to the case 120 to represent the external pattern of the casino chip, the monetary value, etc. However, it is preferred where the case 120 is formed via two or more injection molding processes so that the printing of the pattern, the monetary value, etc. is not easily erased and is more durable.

The embodiment of the RFID tag-embedded casino chip according to the present invention preferably further includes a decal 122 which is attached to center portions of the top surface and the bottom surface of the plate 112. The decal 122 may be attached to the center portions of the casino chip with a casino logo or the like printed thereon. The decal 122 is shown to be attached to both outer surfaces of the plate 112, but the present invention is not limited to this embodiment and may also be attached to only one outer surface.

In this case, the decal 122 attached to one outer surface of the plate 112 may be implemented as a magnetic sheet. The decal 122 implemented as the magnetic sheet is attached to the casino chip, so that a conventional magnetic detection system, installed at the exit of a casino for the purpose of preventing the theft of casino chips, can be used without change. That is, it is possible to use conventional equipment without newly installing a casino chip antitheft system. However, it is preferable to install an RFID detection system at places requiring security, such as the exit of a casino and a casino chip depository, so as to prevent the theft of RFID tag-embedded casino chips.

Hereinafter, an RFID tag will be described in detail.

Figure 3:
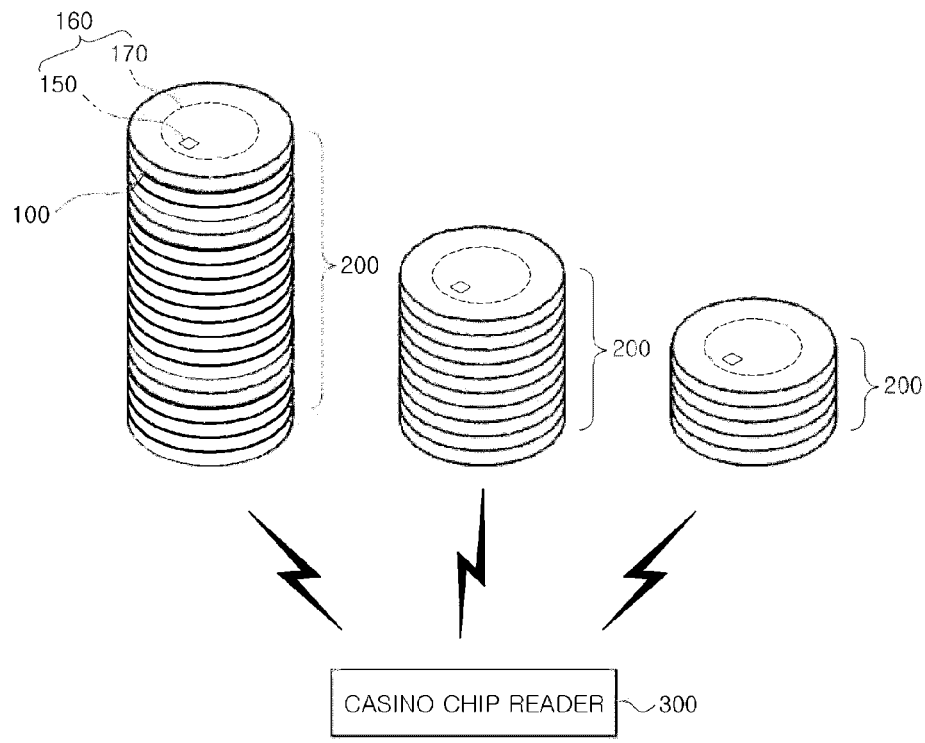
FIG. 3 is a view showing an embodiment of the RFID tag-embedded casino chip according to the present invention and a separate casino chip reader.

FIG. 3 is a view showing an embodiment of an RFID tag-embedded casino chip according to the present invention and a separate casino chip reader. For ease of illustration, a protective film 118, a case 120, a decal 122, etc. are omitted in the drawings.

As shown in FIG. 3, in the embodiment, the RFID tag of each RFID tag-embedded casino chip according to the present invention can communicate with a separate casino chip reader 300, thus transmitting information, stored in the RFID tag 160 embedded in the casino chip 100, to the separate casino chip reader 300 using radio waves, and enabling the casino chip reader 300 to read or update the information stored in the RFID tag 160 using radio waves.

The IC 150 of the RFID tag 160 can store information about the casino chip 100, for example, the unique ID number of the casino chip 100, the monetary value assigned to the casino chip, etc., and the antennae 170 can transmit the information stored in the IC 150 to the casino chip reader 300 and can receive predetermined signals from the casino chip reader 300.

The RFID technology used in the embodiment of the RFID tag-embedded casino chip according to the present invention can use all of passive, semi-passive and active RFID technologies. According to the embodiment of the present invention, the IC 150 and the coil of the antennae 170 can be configured to use an RFID communication frequency which is equal to or greater than 20 MHz and is equal to or less than 25 MHz, preferably, which is equal to or greater than 21 MHz and is equal to or less than 24 MHz. By performing RFID communication with the RFID tag 160 having the frequency falling within such a range, even if 20 to 25 casino chips 100 are stacked together, the casino chip reader 300 can accurately identify pieces of information stored in the ICs 150 of the casino chips 100, as shown in the following Table 1.

TABLE 1

| RFID tag Freq (MHz) | 13.96 | 19 | 20 | 21 | ... | 24 | 25 | 26 |
|---|---|---|---|---|---|---|---|---|
| Number of casino chips in one pile readable by reader | 12~13 | 18 | 20 | 23 | ... | 22 | 20 | 18 |
| stability | unstable | unstable | Stable | stable | ... | stable | stable | unstable |

In this case, when the casino chip reader 300 performs RFID communication with one casino chip, communication is performed using the unique frequency of the RFID tag 160 embedded in the casino chip, that is, the RFID communication frequency which is equal to or greater than 20 MHz and is equal to or less than 25 MHz, preferably, which is equal to or greater than 21 MHz and is equal to or less than 24 MHz. However, when multiple casino chips are stacked in a pile, variation occurs in the frequency at which a pile 200 of casino chips and the casino chip reader 300 communicate with each other, and thus the frequency at which actual communication is performed may fall out of the frequency range which is equal to or greater than 20 MHz and is equal to or less than 25 MHz. However, even if RFID communication is performed outside of the above unique frequency range of the RFID tag 160 embedded in the casino chip according to the present invention, the casino chip reader 300 can accurately read the information of the casino chip according to the present invention.

Further, RFID communication is performed using the frequency of the casino chip which is equal to or greater than 20 MHz and is equal to or less than 25 MHz, preferably, which is equal to or greater than 21 MHz and is equal to or less than 24 MHz, thus reducing the distance of interference with surrounding reading areas to 3 cm or less. The distance of interference at that time refers to the distance of interference occurring when 20 or more casino chips are stacked together. As shown in the following Table 2, when 10 casino chips are stacked together, the distance of interference can be reduced to 2.5 cm or less, and when five casino chips are stacked together, the distance of interference can be reduced to that distance or less. Hereinafter, the term 'distance of interference' means the distance at which interference occurs when 20 or more casino chips are stacked together.

TABLE 2

| Number of casino chips in one pile | 25 | 20 | 15 | 10 | 5 |
|---|---|---|---|---|---|
| Distance of interference | 3.2 cm | 3 cm | 2.8 cm | 2.5 cm | 1.8 cm |

Therefore, in the case where there is a plurality of casino chip piles 200, each having a plurality of casino chips 100 stacked together, if the interval between neighboring casino chip piles 200 is 3 cm or more, the casino chip reader 300 can accurately read the information stored in the ICs 150 of the casino chips 100.

Hereinafter, the plate of the RFID tag-embedded casino chip will be described in detail.

Figure 4:
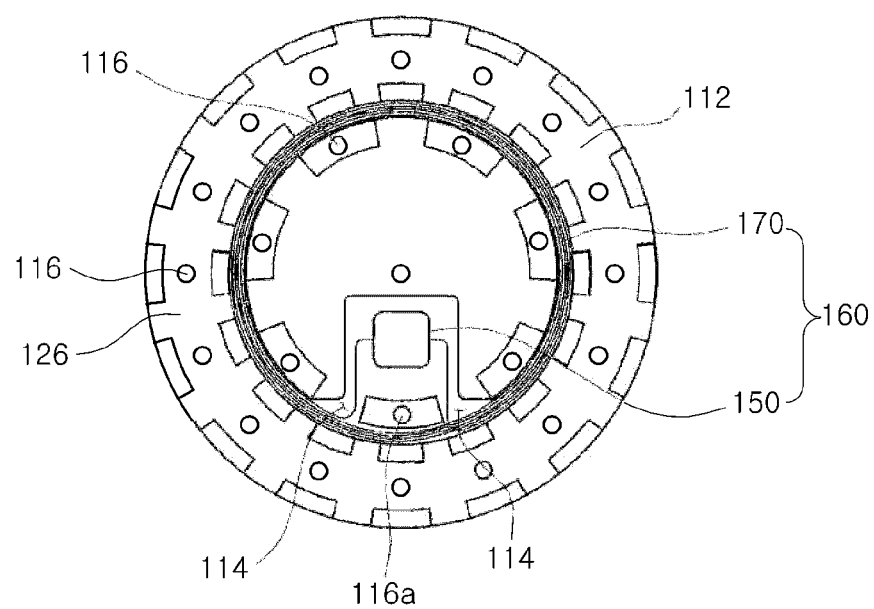
FIG. 4 is a plan view showing an embodiment of the plate of the RFID tag-embedded casino chip according to the present invention.

FIG. 4 is a plan view showing an embodiment of the plate of the RFID tag-embedded casino chip according to the present invention.

An embodiment of the plate of the RFID tag-embedded casino chip according to the present invention is preferably implemented as a mixture of nylon and copper having a form of minute particles or powder. The plate 112 is manufactured using nylon and copper, so that the influence of noise on the frequency at which RFID communication is performed can be minimized, and the plate can resist the high temperature and pressure during the manufacturing process. Further, in order to manufacture casino chips having a weight suitable for play, the content of copper which is a material having a slightly high specific gravity can be adjusted.

A groove 114 is formed in the plate 112, and the RFID tag 160 is mounted in the groove 114 of the plate 112. Further, in the plate 112, one or more holes 116 and a depression 126 around the holes 116 may be formed. The holes 116 may be formed along the circumference of a circle having a predetermined radius from the center of the plate 112 at regular intervals. Due to the holes 116 and the depression 126, injection molding can be easily performed during the manufacturing process. In particular, a hole 116*a* formed adjacent to the IC 150 very effectively protects the IC 150 and the antennae 170 and maintains the strength of the groove 114 during the injection molding procedure.

Hereinafter, the protective film of the RFID tag-embedded casino chip will be described in detail.

Figure 5:
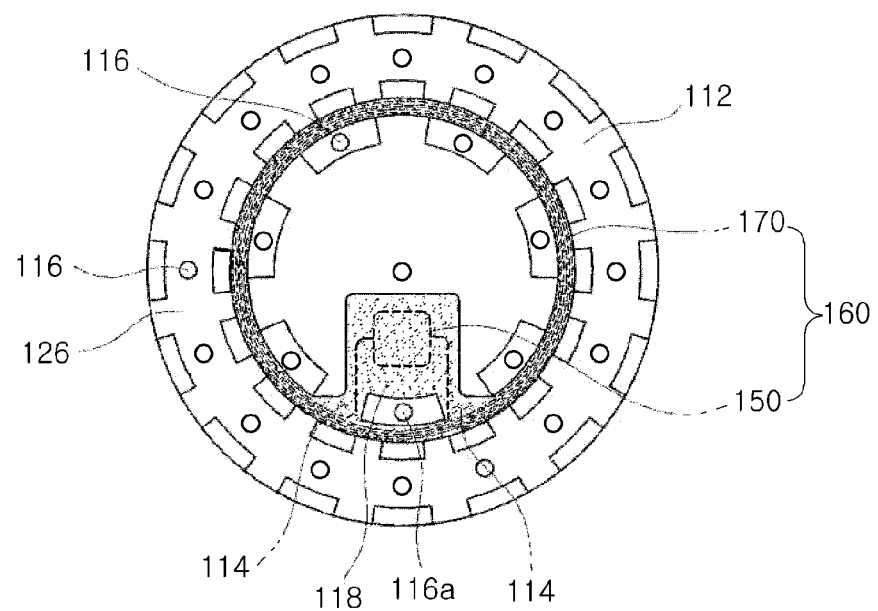
FIG. 5 is a plan view showing an embodiment of the plate of the RFID tag-embedded casino chip according to the present invention, the plate including a protective film 118.

FIG. 5 is a plan view showing an embodiment of the plate of the RFID tag-embedded casino chip according to the present invention, the plate including a protective film 118.

As shown in FIG. 5, the protective film of the RFID tag-embedded casino chip is formed on the top of the RFID tag 160 and fills the groove 114, thus preventing the RFID tag 160 from being damaged by high temperature and pressure during the manufacturing process. The protective film 118 is preferably formed using an epoxy-based molding solution. Epoxy, a thermosetting plastic material, can protect the RFID tag 160 against the influence of the external environment by isolating the RFID tag 160 from the outside.

Although circular casino chips have been illustrated and described in embodiments of the present invention, the present invention can also be applied to rectangular, regular quadrilateral, circular and elliptical French chips, as well as circular American chips. Accordingly, the shapes of the plate and the case, the winding forms of a coil in the antennae, etc. can be suitably varied.

Further, in the case of American chips, the sizes of casino chips are 39 mm, 41 mm, 43 mm, and 45 mm, and thus the sizes of the plate and the case can be suitably designed and manufactured depending on the sizes of chips to be manufactured.

Although certain preferred embodiments of the present invention have been disclosed, the present invention is not limited to those embodiments, and various changes and modifications by those skilled in the art should be interpreted as being included in the scope of the present invention.

The invention claimed is:

1. A casino chip comprising:
a Radio Frequency Identification (RFID) tag configured to generate a radio frequency signal; an antennae connected to the tag and comprising a coil wound in a diameter from 22 mm to 27 mm; and
wherein the radio frequency signal generated by the RFID tag is in a frequency range from 20 MHz to 25 MHz such that one RFID reader can identify each chip even if about 20 of the casino chip are stacked together in a pile and individually generate such signals.

2. The casino chip according to claim 1, wherein a distance of interference between the casino chip pile and other casino chip piles adjacent thereto is 3 cm or less.

3. The casino chip according to claim 1, further comprising:
a plate comprising a cavity and a groove, wherein the RFID tag is positioned in the cavity, the antennae is positioned in the groove;
a protective material formed over the RFID tag and the antennae; and
an injection-molded layer covering a rim portion of the plate.

4. The casino chip according to claim 3, wherein the plate includes one or more holes formed therein.

5. The casino chip according to claim 3, wherein the plate is made of a mixture of nylon and copper.

6. The casino chip according to claim 3, wherein the protective material is formed using an epoxy-based molding solution.

7. The casino chip according to claim 3, further comprising a decal covering a center portion of the plate, wherein the decal comprises a magnetic sheet.

8. The casino chip according to claim 1, wherein the frequency range is from 21 MHz to 24 MHz.

* * * * *